Oct. 21, 1969  D. WILM ET AL  3,473,300
APPARATUS FOR SEPARATING SOLID MATTER FROM AEROSOL SUSPENSIONS
Filed Feb. 6, 1968

INVENTORS
Diederich Wilm
Willi Flasskamp
Eduard Broft
Kurt Jordan
BY Stephens, Huettig and O'Connell
ATTORNEYS

United States Patent Office 3,473,300
Patented Oct. 21, 1969

3,473,300
APPARATUS FOR SEPARATING SOLID MATTER FROM AEROSOL SUSPENSIONS
Diederich Wilm, Dortmund, Brechten, Willi Flasskamp, Stierstadt, Taunus, Eduard Broft, Frankfurt am Main, and Kurt Jordan, Lubeck, Germany, assignors to Deutsche Gold- und Silber-Scheideanstalt vormals Roessler, Frankfurt am Main, Germany
Filed Feb. 6, 1968, Ser. No. 703,344
Claims priority, application Germany, Feb. 11, 1967, D 52,262
Int. Cl. B01d 41/00, 46/48
U.S. Cl. 55—302                       2 Claims

ABSTRACT OF THE DISCLOSURE

In an apparatus for separating solid matter from aerosol suspensions the raw gas is initially cleaned of coarse matter in a plurality of centrifugal separators and then passed into filter chambers for final cleaning. Clean gas from the filters is used both for rinsing the filter chambers and for recycling dirty gas back to the separators. The apparatus is held at a constant gas pressure and heated to hold it at a constant temperature.

---

This invention relates to an apparatus for separating solid matter or particles from aerosol suspensions. The solid matter is initially separated in centrifugal separators and finally separated in at least two web filter chambers in which the filter material is composed of fiberglass. The filter chambers are rinsed with clean gas which is recycled to the separators. A constant pressure is maintained throughout the system.

Aerosol suspensions carrying fine dust have heretofore been sent through a centrifugal separator and then through two or more filter chambers. The major portion of the dust is removed in the centrifugal precipitators. The fine-grained dust remaining is then removed in special filters under quite definite conditions.

The special filters for the removal of lightweight solid matter, such as fine-grained silicic acid, and pigments such as soot have known disadvantages. The disadvantages occur because of the high temperatures of the dust-laden aerosol suspensions, which temperatures have to be maintained in various filtering methods. For example, while soot is precipitated in many cases from aerosol suspensions having a high dew point, there exists on the other hand the danger that the apparatus and filter material can be damaged because of the combining of sulphur with oxygen.

The dew point of such gases is about from 100 to 150° C. and therefore the fine dust particles must be removed at an operating temperature of at least 200° C., especially in order to avoid the desublimation of damaging residue.

However, customary web filters cannot withstand such high temperatures. Only thermically and chemically durable webs, such as fiberglass webs and synthetic webs made, for example, from polyamides or polyfluorocarbons and/or webs which have been impregnated to increase their thermal or chemical durability, together with materials such as graphite, silicons or polyfluorocarbons, or have been coated with such. Since the synthetic webs are very expensive, fiberglass is commonly used. Depending upon the mechanical sensitivity of these materials, they are

2 cleaned simply by means of a counter rinse and not by mechanical means, such as knocking, vibrating or pulsating, so that the permeability of the filter material is retained.

When the filter chamber is to be cleaned, it is changed over into its cleaning position. This makes it possible to clean all the filter chambers in a regular cycle. Conventionally, the filter chambers each have two closure members, such as valves, on the dirty gas side and also on the clean gas side which means a total of four closure members for each filter chamber. When changing over from one filter chamber to another, pressure waves can occur during actuation of the valves which cause great mechanical wear and tear on the filter web and thus reduces the life span of such web.

It is also known to recycle the flow of cleaning fluid, after it has passed the filters and use it as a pneumatic conveyor for transferring dust that has been rinsed from the filter surfaces, to a special precipitator in front of the precipitating system. In this case, however, the pressure waves caused from changing over from one filter chamber to another are present to a very disadvantageous extent.

It is the object of this invention to produce a means for extending the life span of the filter web, to improve the operating stability of the filters and, as a result thereof, to eliminate reverberating pressure differences in filters which are very sensitive to pressure waves.

In this invention, it has been found that pressure variations in the filter system and any mechanical or chemical stresses on the filter webs can be avoided by using the following method steps which, depending upon individual requirements, can be used singly or in combination:

(a) Passing at least a portion of the clean gas through a by-pass pipe having a pressure equalizing valve set for the filter resistance and a control valve to a return pipe carrying removed solid matter during change-over from gas cleaning to filter chamber rising for holding a constant pressure and gas flow in the separators and chambers while drawing gas through the chambers and the clean gas through a common blower positioned in said return pipe between said separators and said chambers;

(b) Heating the separators, chambers and connecting parts to maintain a constant temperature at all times including non-washing periods;

(c) Recycling the gas in said return pipe and through said blower into the separators and/or an agglomerator connected to the separators.

The agglomerator can be a mechanical swirling vortex device, a recoil or reflection vortex device, a hydrodynamic vortex, a coagulating device, or an electric or ultrasound flocculator.

The mechanical stresses on the filter web are eliminated by the method of this invention.

The complete rinsing of the filter chamber and connecting pipes by means of the by-pass pipe at regularly frequent intervals not only prevents dust deposits, but also prevents unacceptable localized cooling of some of the parts and thus prevents condensation and resulting damage therefrom.

When cleaning gases having a high moisture content and high dew point are used, this is especially important for preventing the filters from being damaged during starting stopping of the process by the condensates which would drip from the filter cover and the clogging of the filter webs by a coating of hardening moist dust.

The dust rinsed from the filter chambers is recycled into the separators and acts as seeds for agglomerating or coagulating the dust in the incoming raw gas and thus increases the dust removed in the separators and leaves less dust to be removed in the filter chambers.

The means by which the objects of the invention are obtained are described more fully in the accompanying drawings in which:

FIGURE 1 is a schematic perspective view of the apparatus used in this invention; and FIGURE 2 is a schematic front elevational view of a modification of FIGURE 1.

As shown in FIGURE 1, the cyclone separators 1, 2 and 3 produce the initial or pre-precipitation of the dust carrying dirty gas and filter chambers 4, 5 and 6 remove the remaining fine solid matter particles to produce the finished clean gas. More than three separators are used and at least two filter chambers must be used. As shown in FIGURE 2, an agglomerator 7 is installed between the cyclone separators 1a and 2 for combining fine dust particles not precipitated or removed in separators 1 and 1a with dust particles recycled from filter chamber 4, 5 or 6 in order to increase the size of the dust particles carried on to separators 2 and 3. Filter chambers 4 and 5 are shown in filtering operation while chamber 6 is in the rinsing position.

In this invention, the raw dust-laden gases flowing through pipe 8 enter tangentially the separator 1 and in this separator about 50–70% of the dust is removed. Gases leaving separator 1 contain very fine dust particles and before the gas containing the fine particles enters cyclone 2 or a subsequent cyclone, this gas is combined with the gas recycled from at least one of the filter chambers 4 to 6 which contains dust particles filtered out of the gas which are of larger size. These gases are recycled through return pipes 13 and 16 connected to filter chambers 4 to 6 which enter the gases coming from separator 1 at pipe joint 23. The two streams of gas intimately mix and coagulate or agglomerate the dust particles substantially because of the seeding effect of the coarser particles and thus product large particles which can be more readily precipitated in separators 2 and 3.

In FIGURE 2, the initial cyclone separating zone is composed of four separators 1, 1a, 2 and 3 and with an agglomerator 7 positioned between cyclones 1, 1a and 2, 3.

The gases leaving the separator 3 contain about 5 to 10% dust and flow through pipe 9 through open valves 10a and 10b into the conical bottom portions 4a and 5a of the filter chambers 4 and 5 which are in filtering position. The gases flow upwardly through fiberglass tubes 4c and 5c which have open bottoms fastened at the bottom to the joints 4b and 5b. The tubes are held under tension by being fastened by springs or by being adjustable at their upper ends 4d and 5d to the covers 4e and 5e of the filter chambers, respectively.

The dust particles in the gas are substantially completely removed in the filter tubes while the clean gas flows out of the filter chambers through pipes 11a and 11b, respectively, into the common clean gas pipe 12 which is either sent to a heat exchanger for the recovery of heat or is otherwise disposed of. In order to protect the apparatus, explosive pressure release valves, not shown, are installed in the filter chambers as well as in the various connecting pipes for the dust-laden gas and pure gas.

Filter chamber 6 is in rinsing position so that clean gas is drawn downwardly through pipe 11c into the filter chamber and through pipe 13 to blower 15. The clean gas flows downwardly through the tube 6c and picks up filter dust and pneumatically moves the dust through the conical bottom 6a, the throttle valve 14 and into the blower 15. Thus the large filter particles removed from filter chamber 6 are recycled as so-called seeds into the separators 2 and 3 and/or the agglomerator 7 wherein the recycled dust particles have a strong coagulating effect on the fine dust particles not removed by the separator 1 of FIGURE 1 or the separators 1 or 1a of FIGURE 2.

Because of the particular position of the blower 15, it is possible to eliminate the valves for the rinsing gas and the clean gas on the clean gas side of the filter chambers. In this manner, this invention not only substantially simplifies the mechanical portions of the filter apparatus, but also, at the same time, frees the entire apparatus from uncontrollable variations of pressure and makes it less prone to disruption and failure.

When changing over filter chamber 6 from filtering position to rinsing position, the valve 10c in the incoming dust-laden pipe is closed and simultaneously the outlet valve 6f for the dust is opened slowly so that no short-circuit can occur. The blower 15, as described, then draws the clean gas used as rinsing gas from the clean gas pipe 12 by way of pipe 11c, tubes 6c and open valve 6f into return pipe 13.

In order to prevent pressure wave knocks as well as reverberating pressure waves that might affect very sensitive filters and to prevent, above all, any mechanical stresses in the filter webs during change-over from one filter chamber to the other which is done at regular intervals adjustable with regard to timing during the filtering, rinsing and recycling steps, the clean gas pipe 12 is connected with the return pipe 13 by a by-pass pipe 17 so that the gas flowing to the blower 15 remains the same during the change over. Since by-pass pipe 17 is connected to the inlet end of return pipe 13, dust deposits and thus damaging localized cold spots are prevented as the return pipe 13 is being rinsed at regular intervals. For this purpose, a pressure equalizing valve 18 set to the resistance produced by the tubes in the filter chambers is mounted in pipe 17. A control valve 19 is also mounted in pipe 17 and is actuated during change over from one chamber to another and in counter movement to the dust outlet valves 4f, 5f and 6f and in order to control the flow of the rinsing gas through the by-pass pipe during change over. An equal pressure can be maintained in the system because of the cooperative effect of the equalizing valve 18 and the control valve 19 in by-pass pipe 17 even during change over.

A constant temperature is maintained in the apparatus by applying heat to the outside of chambers 4, 5 and 6 by means of heating coils 20 and applying heat to separators 1, 2 and 3 by heating coils 21 and the corresponding connecting parts can also be heated.

The closing valves can be operated by means of a programmed control apparatus. The program acts in a mechanical, electrical, pneumatic or hydraulic manner or a combination of these. An electro-pneumatic control and actuation apparatus is especially preferred, and this being actuated by means of a programmed control apparatus connected to a retarding control apparatus. This makes possible a transposition of the program time and the adjustment to optimum operational conditions.

A filter apparatus operating according to this invention has a tube duribality up to about four years.

Having now described the means by which the objects of the invention are obtained,

We claim:

1. An apparatus for precipitating solid matter from aerosol suspensions in a gas comprising a plurality of cyclone separators connected in series, a plurality of filter chambers connected in parallel containing filter tubes, pipe means (9) connecting a downstream separator and chambers, a clean gas outlet pipe (12) common to said chambers, a return gas pipe (13) common to said chambers and connected to said chambers for the removal of solids, a by-pass pipe (17) extending between said clean gas pipe and said return pipe downstream of the filter chambers, a pressure equalizing valve (18) in said by-pass pipe and set to the resistance produced by said filter tubes, a control valve (19) in said by-pass pipe, gas inlet valves (10a, 10b, 10c) in said pipe means connected between said downstream separator and said chambers, gas and solid outlet valves (4f, 5f, 6f) connected between each of said chambers and said return gas pipe, a blower (15) in said return gas pipe between said separators and said chambers, and agglomerator means connected to said return gas pipe and a said downstream separator for mixing recycled gas coming from said return pipe with gas entering at least one of the separators.

2. An apparatus as in claim 1, said by-pass pipe being joined to the gas inlet end of said return pipe.

References Cited

UNITED STATES PATENTS

| | | | |
|---|---|---|---|
| 1,784,278 | 12/1930 | Dollinger | 55—96 |
| 1,784,339 | 12/1930 | Clasen et al. | 55—287 |
| 2,276,805 | 3/1942 | Tolman | 55—288 |
| 2,717,658 | 9/1955 | Bethea et al. | 55—97 |
| 3,146,080 | 8/1964 | Ruble et al. | 55—97 |
| 3,318,070 | 5/1967 | Zeiss et al. | 55—1 |
| 3,364,661 | 1/1968 | Manherz et al. | 55—486 |

FOREIGN PATENTS

| | | |
|---|---|---|
| 252,688 | 6/1964 | Australia. |
| 344,255 | 3/1931 | Great Britain. |

HARRY B. THORNTON, Primary Examiner

BERNARD NOZICK, Assistant Examiner

U.S. Cl. X.R.

55—315, 431, 338, 341, 349